United States Patent
Shi

(10) Patent No.: US 9,392,441 B2
(45) Date of Patent: Jul. 12, 2016

(54) METHOD AND APPARATUS FOR CONTROLLING UPDATES TO A MOBILE DEVICE

(71) Applicant: Spreadtrum Communications (Shanghai) Co., Ltd., Shanghai (CN)

(72) Inventor: Yanshan Shi, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 14/438,737

(22) PCT Filed: Dec. 16, 2013

(86) PCT No.: PCT/CN2013/089500
§ 371 (c)(1),
(2) Date: Apr. 27, 2015

(87) PCT Pub. No.: WO2015/014074
PCT Pub. Date: Feb. 5, 2015

(65) Prior Publication Data
US 2015/0257000 A1  Sep. 10, 2015

(30) Foreign Application Priority Data

Aug. 1, 2013  (CN) .......................... 2013 1 0333085

(51) Int. Cl.
*H04W 8/24* (2009.01)
*H04M 1/725* (2006.01)
*H04W 12/08* (2009.01)
*G06F 9/445* (2006.01)

(52) U.S. Cl.
CPC .............. *H04W 8/245* (2013.01); *G06F 8/66* (2013.01); *H04M 1/72583* (2013.01); *H04W 12/08* (2013.01)

(58) Field of Classification Search
CPC . H04W 8/245; H04W 12/08; H04M 1/72583; G06F 8/66
See application file for complete search history.

(56) References Cited

U.S. PATENT DOCUMENTS

| | | | |
|---|---|---|---|
| 7,293,289 B1 * | 11/2007 | Loc et al. | 726/23 |
| 2005/0091501 A1 * | 4/2005 | Osthoff et al. | 713/181 |
| 2006/0294369 A1 * | 12/2006 | Matsushima et al. | 713/164 |
| 2009/0282265 A1 | 11/2009 | Aissi et al. | |

FOREIGN PATENT DOCUMENTS

| | | |
|---|---|---|
| CN | 101090452 | 12/2007 |
| CN | 101251883 | 8/2008 |
| CN | 101437224 | 5/2009 |

OTHER PUBLICATIONS

Notification of Transmittal of the International Search Report and the Written Opinion of the International Searching Authority, or the Declaration dated May 14, 2014.

\* cited by examiner

*Primary Examiner* — Brandon Miller
(74) *Attorney, Agent, or Firm* — Finnegan, Henderson, Farabow, Garrett & Dunner, LLP

(57) ABSTRACT

The present invention discloses a method and apparatus for controlling updates to a mobile device consisting of checking a ROM installation package and storing the check data, or encrypting a ROM installation package and storing said encrypted ROM installation package. The stored check data is used to check a ROM installation package or to decrypt a stored encrypted ROM installation package when updating a mobile device. If it is verified to be correct or to be decryptable, the verified or decrypted ROM installation package is installed. If it is verified to have errors or to be undecryptable, the installation of the ROM installation package is terminated. The present invention reduces the risks associated with the destruction or disclosure of data when mobile devices are lost.

16 Claims, 1 Drawing Sheet

METHOD AND APPARATUS FOR CONTROLLING UPDATES TO A MOBILE DEVICE

FIELD OF THE INVENTION

The present invention relates to the field of mobile communication devices, particularly a method and apparatus for controlling updates to a mobile device.

BACKGROUND

The appeal of smart mobile devices continues to increase with the advances in communication technology. They come in an ever-increasing array of forms, including smart phones, tablet computers with communication capabilities, and watches with communication, navigation and medical testing functions. The major operating systems for smart devices include Apple's iOS, Google-backed Android and Microsoft's Windows Phone. Smart devices are typically characterized by having a substantial number of peripheral devices and a broad range of applications. They are often equipped with GPS systems, blue tooth, WiFi, FM radio, high-resolution cameras and large touchscreens, and support one or more of the various communication modes such as 2G systems including GSM, GPRS and EDGE, and 3G systems including WCDMA, CDMA2000 and TD-SCDMA. Some also support the LTE system. There are thousands of applications that can be downloaded from the web and installed on smart devices, including map navigation, cell phone banking and games.

Various types of sensors can be put into smart devices, including gravity sensors, acceleration sensors, directional sensors, triaxial gyroscopes, distance sensors, light sensors and electronic compasses. A gravity sensor works using piezoelectricity. With the standard application for a gravity sensor, the screen display rotates in sync with the smart device itself when the smart device rotates by about 90 degrees, so that the information shown on the screen, such as text, is maintained in a state that is parallel to gravity, i.e. from top to bottom. An acceleration sensor is an electronic instrument measuring acceleration. A directional sensor detects what direction the device is positioned in, which is not the commonly understood function of a compass. Rather, it can detect whether the device is vertically upright, vertically upside down, horizontally to the left, horizontally to the right, lying face up or lying face down. A directional sensor is more properly called an angular velocity sensor. A triaxial gyroscope detects positions in six different directions, along with mobile tracks and acceleration. A distance sensor uses the principle of time measurement to find distance as a means of detecting the distance of an object. When making a call the screen on the cell phone will automatically turn off, but when the face of the caller moves away from the phone the screen will automatically come back on again and unlock. A light sensor adjusts the brightness of the screen based on the degree of brightness of the light around it. An electronic compass, also known as an azimuth sensor or a digital compass, utilizes the geomagnetic field to establish the North Pole. Smart devices can be equipped with all or a portion of the aforementioned sensors.

Smart devices usually come with a large capacity battery and a large capacity storage unit such as a 4 GB to 32 GB SD card. Large capacity storage units can be internal or external. Internal storage units are installed internally in smart devices as part of their hardware, while external storage devices can be independently extracted and replaced, in which case the smart devices need only provide the capability for reading from and writing to said equipment such as an SD card slot. Costs are obviously higher for smart devices than for cell phones with traditional functions, and they provide stronger processing capabilities, more comprehensive functionality and the ability to store and handle greater amounts of data and information. This also means that losing a smart device is a greater loss to a consumer. The primary loss is the cost of purchasing a new device, though there are also risks associated with the data stored on the storage unit of the lost device. Said risks are characterized by the following: the risk of the disclosure of private information or commercial secrets; and the risk of the destruction of data, such as audio-visual evidence can be deleted by other people resulting from losing the device.

Smart devices generally provide a reset function so that factory settings can be recovered. This operation resets the entire device and deletes all of the data stored on it. Resetting is the equivalent of using a portion of the system stored on the smart device to perform a recovery so that the operating system and all of the data are reset and the cell phone is in a state which is the same or close to how it was when it was shipped from the factory. The reset process uses data stored in the ROM of the smart device. ROM is an abbreviation for "read-only memory." It is a solid state semiconductor memory unit from which data stored on it beforehand can only be read. Once the information is stored on the ROM it cannot be modified or deleted, and no information on it is lost when the power of the device is turned off. The ROM in smart devices is a little different from the ROM as it is commonly understood. In most circumstances it can only be read and not written upon, though things can be written into the ROM in certain special cases. The ROM in smart devices is where the operating system is stored, and rewriting on it is generally not permitted for the sake of the safety of the system. This is why the operating system stored in the ROM can only be read and not modified or rewritten. However, there are computer programs that can be used to modify and rewrite in the ROM in order to perform system upgrades. What is known as "wiping" is really rewriting in the ROM. System upgrades can be performed by downloading upgrade packages onto the cell phone's storage unit, and then during the reboot process the check and validation are performed after which the mobile device performs the installation, which is when the information in the ROM is updated. Packages used in the ROM of the mobile device to wipe the system or upgrade including the system update package, system upgrade package, and system migration package are known as the ROM installation package.

Using the Android system as an example, a complete root directory for the ROM comprises the following folders and files: four folders including "data," "META-IN," "system" and "boot.img." The data directory contains the programs for installing user applications. The META-IN directory contains information related to the system, generally including information related to the system version of the ROM after being modified. The system directory contains information relating to the system, and is the equivalent of the Windows folder for the Windows operating system. Boot.img is a mirror image file, and is a kernel, which is generally used when migrating the ROM.

Operating systems for mobile devices provide a lock screen function to prevent losses caused by losing a cell phone. Users can specify images and passwords that are required to unlock the screens so that it is difficult for other people to unlock them and use their mobile devices. This is a preliminary form of protection for the data stored on the internal storage unit of the mobile device, but naturally it cannot defend against cracking the locked screen by wiping the device. Privacy protection and anti-theft applications can be installed on mobile devices in the form of cell phone guard software. With these types of software users can set up passwords with respect to the running authority of designated data and applications. They also feature functions such as sending a text message to a designated number when a new card is installed in a phone; when said text message is received, performing specific operations including, for example, a positioning application will proceed, and location information will be sent to a designated number, or a photograph will be taken and said photograph will be sent to a designated number, or a warning sound will be emitted when data on the phone is destroyed, etc.

Numerous anti-theft and security applications for cell phones have appeared in recent years. These include storing the identity information on the SIM (subscriber identity module) card in the ROM of the phone, binding the SIM card to the device, and using the security password set up by the user to check whether the actual owner of the mobile device is the person who is using the phone. This is to determine whether to go into anti-theft mode. The phone's functions are limited when in anti-theft mode, and in some cases certain remote control operations can be performed using the mobile device via the phone number of a predetermined contact. Other applications bind the encryption of the memory card to the identity of the SIM card so that information stored in the memory can only be read when the device owner's SIM card is being used. Other applications check the upgrade package for a cell phone using public and private keys to prevent illegitimate programs from being installed on it.

However, these solutions do not completely resolve issues associated with security and user-friendliness because the user's SIM card is usually lost at the same time as the mobile device. Binding the SIM card to the mobile device will not guarantee that the data stored in the internal memory of the mobile device will not be read, and will not prevent the stored data from being reset if the mobile device is wiped. Furthermore, the mobile device cannot be updated if the SIM card is destroyed.

BRIEF SUMMARY OF THE DISCLOSURE

The objective of the present invention is to provide a method and apparatus for controlling updates to mobile devices to reduce the risks associated with the destruction or disclosure of data when mobile devices are lost.

As a means of realizing said objective, the present invention provides a method of controlling updates to a mobile device comprising the following:

Checking a ROM installation package and storing the check data, or encrypting a ROM installation package and storing said encrypted ROM installation package.

The stored check data is used to check a ROM installation package or to decrypt a stored encrypted ROM installation package when updating a mobile device.

If it is verified to be correct or to be decryptable, the verified or decrypted ROM installation package is installed.

If it is verified to have errors or to be undecryptable, the installation of the ROM installation package is terminated.

Optionally, said ROM installation package is checked and said check data is stored, or said ROM installation package is encrypted and said encrypted ROM installation package is stored, only when the screen of said mobile device is in an unlocked state.

Optionally, the operations for checking a ROM installation package and storing the check data, or encrypting a ROM installation package and storing said encrypted ROM installation package, specifically comprise the following:

Configuring user data and storing said user data and/or the checked or encrypted data for said user data in the mobile device.

Saving the SIM card data and/or the checked or encrypted data for said SIM card data in the mobile device.

Using the user data or SIM card data, or the checked or encrypted data for said user data or SIM card data, to check the ROM installation package and store the check data, or encrypt the ROM installation package and store said encrypted ROM installation package.

Optionally, said user data or SIM card data, or the checked or encrypted data for said user data or SIM card data, is stored in the ROM of the mobile device.

Optionally, said user data includes a portion or the entire contact data in an address book, passwords configured by the user, password reset questions and answers, or passwords or keys generated by the mobile device stored on the mobile device and/or the SIM card.

Optionally, when it is verified to have errors or to be undecryptable and the installation of the ROM installation package is terminated, the data stored in a storage apparatus of the mobile device is encrypted.

Optionally, when it is verified to have errors or to be undecryptable and the installation of the ROM installation package is terminated, a number of times that the installation of the ROM installation package is terminated and/or the dates and times of said terminations are recorded.

Optionally, all of the data stored on a mobile device is deleted when the accumulated number of the terminations of the installation has exceeded a predetermined number, and/or when a period of time since the initial installation termination has exceeded a predetermined time interval.

Optionally, the ROM installation package is installed without performing check or decryption procedures at the relaunch of the installation process when the accumulated number of the terminations of the installation has exceeded a predetermined number and/or when a period of time since the initial installation termination has exceeded a predetermined time interval.

Another aspect of the present invention is that it provides an apparatus for controlling updates to a mobile device comprising a storage unit, a ROM installation package control unit and a check-encryption-decryption unit.

Said storage unit is used to store the ROM installation package, the check data for the ROM installation package and/or the encrypted ROM installation package.

Said check-encryption-decryption unit is used to check or encrypt the ROM installation package stored in the storage unit and to store the check data or encrypted ROM installation package in said storage unit; to check the ROM installation package and to send the check result to the ROM installation package control unit; and to decrypt the encrypted ROM installation package and to send the decryption result back to the ROM installation package control unit.

Said ROM installation package control unit is used to determine the locked or unlocked state of the screen, to control the check-encryption-decryption unit's check or check validation of the ROM installation package in the storage unit or to check the encryption or decryption. It is also used to continue or terminate the installation of the ROM installation package based on the check result or decryption result.

Optionally, the apparatus further comprises a settings unit providing a settings interface allowing the user to configure emergency contacts, passwords and password reset questions and answers, and to store settings in the storage unit.

Optionally, said settings unit further provides a settings interface allowing the user to manually check or encrypt the ROM installation package.

Optionally, said ROM installation package control unit further utilizes a communication unit of the mobile device to send an alarm message to an emergency contact designated by the user and to respond to the text message instruction received from said emergency contact, and to run an operation given in said instruction.

In the present invention, the ROM installation package is checked and then the check data is stored, or the ROM installation package is encrypted and then stored. The stored check data must be used to check a ROM installation package or to decrypt a stored encrypted ROM installation package when updating a mobile device. If it is verified to be correct or to be decryptable, the verified or decrypted ROM installation package is installed. If it is verified to have errors or to be undecryptable, the installation of the ROM installation package is terminated. This is the equivalent of binding the cell phone to the user, or binding the cell phone and the SIM card to the user. If both the cell phone and the SIM card are lost, the binding relationship between the user's checked or encrypted data and the cell phone still exists, and it is possible to determine whether the cell phone has been stolen.

Additionally, the present invention checks the legitimacy of how the installation is being conducted. For example, the check or encryption of the installation package is performed while the screen is unlocked in order to ensure that the installation is actually being run by the user. This step reduces the risks associated with the destruction or disclosure of data when mobile devices are lost.

BRIEF DESCRIPTION OF THE DRAWINGS

The summary of the present invention given above and the specific embodiments given below are better understood when reviewed together with the drawings. It should be clarified that the drawings act only as examples of the present invention for which patent rights are being sought. Reference numbers in the drawings are used to indicate the same or similar elements.

DETAILED DESCRIPTION

The detailed characteristics and features of the present invention given in the embodiments below are sufficient to allow anyone skilled in the art to understand the technical content of the present invention and to implement it. The specification, claims and drawings of the present invention allow those skilled in the art to readily understand the objectives and features of the present invention.

The description of at least one of the exemplary embodiments given below is explanatory only, and does not restrict the present invention and its application or use.

The objective of the present invention is to provide a method for controlling updates to a mobile device in order to reduce the risks associated with the destruction or disclosure of data when mobile devices are lost.

Embodiment 1

Figure 1:
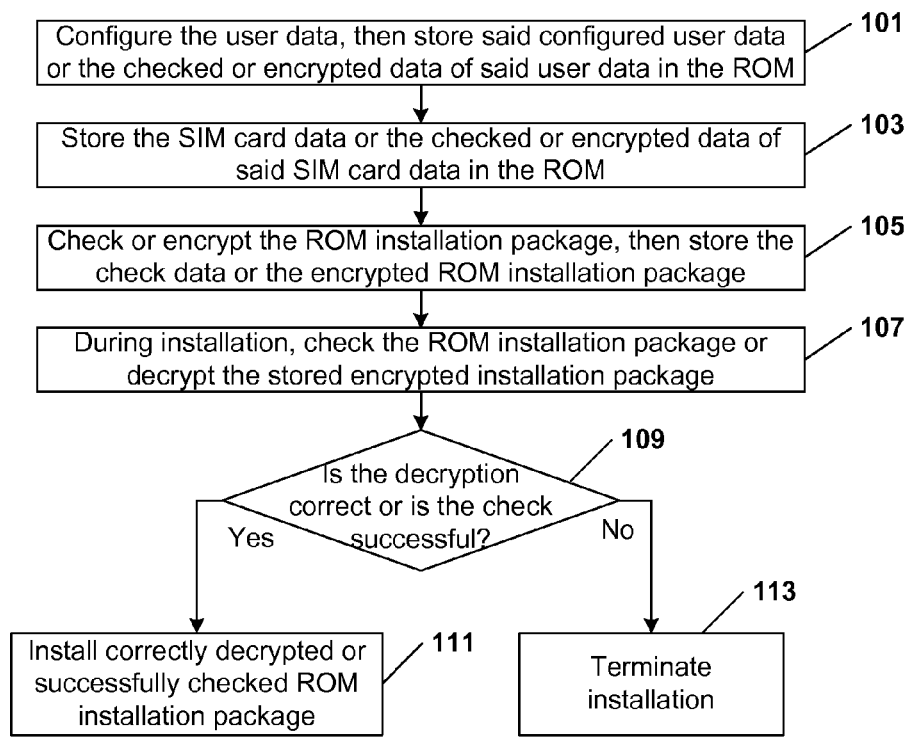
FIG. 1 is a schematic flow chart of Embodiment 1 of the present invention.

FIG. 1 is a schematic flow chart of Embodiment 1 of the present invention.

Step 1 (101): The mobile device provides a settings interface allowing the user to configure data used for encryption or checking. The contents of the settings or the checked data for the contents of the settings are stored in the ROM of the mobile device.

The user data used for encryption or checking includes emergency contacts and/or passwords and password prompt questions and answers. An example might be that the name of an emergency contact is "ABC", said emergency contact's phone number is "138xxxxxxxx", the password is "password", the password prompt question 1 is "birthday", and the answer to question 1 is "0101." The mobile device stores said user data in its ROM or stores the encrypted data for said user data. There are numerous options for encryption methods such as RSA (public key algorithm) and DES (data encryption algorithm). There are also numerous options for encryption processes, including the check for MD5 and the DES encryption process disclosed in patent issuance publication No. CN 100466861 C.

Step 2 (103): The mobile device further stores the SIM card data, or the checked or encrypted data, in the ROM.

For example, the IMSI in a SIM card can be used to run a bitwise Exclusive Or (XOR) operation on the emergency contact "ABC" in step 1, after which it can replace the emergency contact data stored in step 1 with the emergency contact data after it has been put through the Exclusive Or operation. If the IMSI has more digits than the emergency contact, for example if the IMSI has 15 digits and the emergency contact has 8 digits, then the first 8 digits of the IMSI are used in the operation. If the emergency contact has 24 digits, then the IMSI's digits are used in a sequential cycle, i.e. use the first 15 digits and the IMSI to perform a bitwise Exclusive Or operation, and use the last 9 digits and the IMSI's first 9 digits to perform a bitwise Exclusive Or operation.

Or, the IMSI can be stored directly into the ROM.

Step 3 (105): Using the stored user data or SIM card data, or the checked or encrypted data for said user data or SIM card data, to check or encrypt the ROM installation package, and to store the check data or the encrypted ROM installation.

Said ROM installation package can be downloaded online or copied to the mobile device from external devices such as a computer via USB, blue tooth or WiFi.

Said check or encryption operation can be performed using the settings interface of the mobile device, or can be performed directly after the mobile device detects the ROM installation package which has been copied to the storage apparatus. Said mobile device utilizes the settings interface to allow the user to choose the ROM installation files stored on the mobile device, after which the user presses the corresponding buttons to proceed with the check or encryption operation.

For example, use "ABC" as the password and use DES method to encrypt the installation package, and store the encrypted ROM installation package. Or, calculate the MD5 check output data of said installation package, use the IMSI on the SIM card, or the result of Exclusive Or operation using the IMSI on the SIM card and the emergency contact data in step 1, to perform an Exclusive Or operation on said check output data, and store the Exclusive Or operation results for said check output data on the ROM.

Said encryption or check operation is conducted when the screen on the mobile device is unlocked. If the screen is locked the encryption or check operation is not conducted.

Step 4 (107): During the installation the stored check data is used to check the ROM installation package, or the stored encrypted ROM installation package is decrypted.

For example, when the mobile device is restarted and upgraded, "ABC" is used to decrypt the stored encrypted installation package of step 3. Or, the MD5 check output data of said ROM installation package is calculated, and the IMSI on the SIM card, or the result of Exclusive Or operation using the emergency contact data in step 1 and IMSI, is used to perform Exclusive Or operation on said check output data and the check result is obtained.

Step 5 (109): Determine whether it is verified to be correct or to be decryptable. If yes to either, step 6 is performed. If no, step 7 is performed.

For example, the decrypted ROM installation package of step 4 is compared to the pre-encrypted ROM installation package of step 3. If they are the same as each other then it can be decrypted (decryption is correct), otherwise it cannot be decrypted (decryption is in error). Or, the check result of step 4 is compared to the stored check result of step 3. If they are the same as each other then it is verified to be correct (check is successful), otherwise it is verified to have errors (check has failed).

Step 6 (111): Installation of the ROM installation package that has been verified to be correct or decryption is successfully decrypted, and installation is completed.

Step 7 (113): The installation of the ROM installation package is terminated.

This embodiment differs from the existing technology in the following ways:

First, with the existing technology the SIM card data is saved in the ROM, which is the equivalent of binding the cell phone to the SIM card. In this embodiment what is additionally required is that the ROM installation package is checked and the check data is stored or the ROM installation package is encrypted and then stored. The stored check data is used to check the ROM installation package or the stored encrypted ROM installation package is decrypted when updating a mobile device. If it is verified to be correct or to be decryptable, said ROM installation package is installed. If it is verified to have errors or to be undecryptable, the installation of the ROM installation package is terminated. In the present embodiment the user's checked or encrypted data is further saved in the ROM, which is the equivalent of binding the cell phone to the user, or binding the cell phone and the SIM card to the user. If the cell phone and the SIM card are lost, the binding relationship between the user's checked or encrypted data and the cell phone still exists, and it is possible to determine whether the cell phone has been stolen.

Second, with the existing technology, the source of the installation package is checked when checking the ROM installation package, as a means of preventing illegitimate and malicious installation packages from being installed. By contrast, in the present embodiment the legitimacy of the operational actions of the installation is checked. For example, the check or encryption of the installation package is performed while the screen is unlocked in order to ensure that the installation is actually being run by the user.

The user manually performs encryption and checks on the ROM installation package in the settings interface. This means that the user's operations are being performed while the screen is in an unlocked state. Or, when the screen is in said unlocked state, the device automatically runs the ROM installation package which has been copied onto it. Both scenarios mean that the user has the authority to operate and use the device, and that the installation of the ROM installation package is legitimate. If the device gets lost the screen cannot be unlocked by other people, and the aforementioned operations cannot be performed. Also, the installation package copied from the removable storage card will not be installed because it has not been verified. This prevents the device from being wiped, and also ensures that the personal data on the device is encrypted.

The method of controlling updates to mobile devices provided in the present embodiment greatly reduces the risks associated with the destruction or disclosure of data when mobile devices are lost.

Embodiment 2

Embodiment 2 differs from Embodiment 1 in that it adds a procedure to be performed after the installation process has been terminated.

The following is added to step 6 of Embodiment 1:

Step 6.1: Set and save the variable for the abnormal installation termination count to 0.

The following is added to step 7:

Step 7.10: Provide an input interface. Prompt and wait for user data to be input. If the data input by the user is correct, return to step 6.

Step 7.20: Set the variable for the abnormal installation termination count to 1, and save. Record the current date and time.

Step 7.30: If the current abnormal installation termination count is 1, then the SIM card data or user data stored in the ROM is used to encrypt the data stored in the storage apparatus. Said data include files such as directories, photos and documents.

Step 7.40: When the abnormal installation termination count is higher than the preset number, or the time elapsed since the initial abnormal installation termination exceeds a preset duration, then the data stored in the storage apparatus is deleted and the abnormal installation termination count is set to "−1". The next time that the installation is launched, if it is determined that the abnormal installation termination count is "−1", the ROM installation package will not undergo a check or decryption and installation will proceed directly.

Step 7.50: When the abnormal installation termination count is greater than 0, a text message or an email is sent to the emergency contact designated in step 1 when the mobile device wirelessly connects to the Internet. The contents of said message will include a notification that the installation procedure on the mobile device was abnormal or the current location of the mobile device. When/if a text message is sent from the emergency contact's number containing instructions, the device will perform the operations given in said instructions, which may include encryption, deletion, taking a photograph, sending out an alarm, uploading data, establishing the position of the device or uploading location data.

Step 7.50 given above does not necessarily have any sequential relationship to the other steps in step 7.

The preferential value range for the predetermined count given above is greater than 3 and lesser than 100. For example, the count could be set at 10. The preferential value range for the predetermined time interval given above is greater than 3 days and lesser than 100. For example, the time interval could be set at 30 days.

The benefits of Embodiment 2 are that it allows the device to be used after it has been initialized should it be determined that it has been lost or that the user cannot decrypt the device for a reason such as having forgotten the password. This prevents data disclosure while avoiding the waste caused when a device can no longer be used.

Embodiment 3

Embodiment 3 provides an apparatus for the present invention for performing updates safely.

Figure 2:
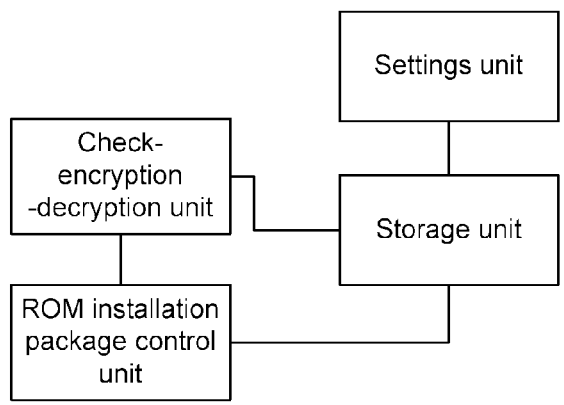
FIG. 2 is a schematic diagram of Embodiment 3 of the present invention.

As shown in FIG. 2, the objective of Embodiment 3 is to provide an apparatus for controlling the mobile device which reduces the risks associated with the destruction or disclosure of data if the mobile device is lost.

The mobile device used for security updates comprises a settings unit 201, a storage unit 203, a ROM installation package control unit 205 and a check-encryption-decryption unit 207.

The settings unit provides a settings interface allowing the user to configure emergency contacts, passwords and password reset question prompts, and to store settings in the storage unit. Thus the settings unit can read from the address book stored on the storage unit as well as write onto said storage unit. The settings unit also provides a settings interface allowing the user to manually check or encrypt the ROM installation package.

The storage unit contains a ROM storage unit and a flash or SD card storage unit, and is used to store user data, the address book, settings data from the settings unit, ROM installation packages, check data for ROM installation packages and encrypted ROM installation packages.

The check-encryption-decryption unit is used to check or encrypt the ROM installation package on the storage unit, as well as store the check data and encrypted ROM installation package on the storage unit. It checks the ROM installation and compares it to the check data stored in the storage unit, and sends the check result to the ROM installation package control unit. It decrypts the encrypted ROM installation package and compares it to the pre-encryption ROM installation package, and sends the decryptable status to the ROM installation package control unit. The check-encryption-decryption unit is also used to encrypt or decrypt user data on the storage unit such as photographs, the address book and documents.

The ROM installation package control unit detects whether the screen is locked or unlocked, controls the check-encryption-decryption unit, and checks or validates the check for the ROM installation package stored in the storage unit, or it performs encryption and decryption verification. It also continues or terminates the installation of the ROM installation package based on the check or decryption result of the check-encryption-decryption unit. When the installation has been paused, it prompts the user to enter the user data, saves the termination count and the termination dates, and controls the check-encryption-decryption unit's encryption or decryption of the user data stored on the storage unit. Or, it deletes the user data stored on the storage unit. It also makes use of a communication unit on the cell phone to send an alarm message to an emergency contact designated by the user and to respond to the text message instructions sent back from said emergency contact, and to run the operations given in said instructions, which may include deletion, encryption, alarm or data upload.

The preferred embodiments of the present invention disclosed above do not limit the present invention. Those skilled in the art can make changes or modifications to it without departing from the spirit and scope of the present invention, therefore the claims of the present invention shall define the designated scope of protection for the present invention.

What is claimed is:

1. A method for controlling updates to a mobile device comprising the following:
   checking a ROM installation package by a check-encryption-decryption unit, or encrypting said ROM installation package by the check-encryption-decryption unit and storing said encrypted ROM installation package by a storage unit;
   storing control data and using said stored control data, by the check-encryption-decryption unit, to check said ROM installation package or to decrypt said stored encrypted ROM installation package when updating the mobile device;
   verifying, by a ROM installation package control unit, said stored encrypted ROM installation package;
   if said stored encrypted ROM installation package is verified to be correct or to be decryptable, installing, by the ROM installation package control unit, the verified or decrypted ROM installation package; and
   if said stored encrypted ROM installation package is verified to have errors or to be undecryptable, encrypting the control data stored in the storage unit by the check-encryption-decryption unit and terminating the installation of the ROM installation package by the ROM installation package control unit,
   wherein said ROM installation package is checked and said control data is stored, or said ROM installation package is encrypted and said encrypted ROM installation package is stored, only when a screen of said mobile device is in an unlocked state.

2. The method of claim 1, wherein checking the ROM installation package, or encrypting the ROM installation package and storing said encrypted ROM installation package, comprises:
   configuring user data and storing the user data and/or the control data or encrypted data for the user data in the mobile device;
   saving SIM card data and/or the control data or the encrypted data for the SIM card data in the mobile device; and
   using the user data or the SIM card data, or the control data or the encrypted data for the user data or the SIM card data, to check the ROM installation package, or encrypt the ROM installation package and store said encrypted ROM installation package.

3. The method of claim 2, wherein the user data or the SIM card data, or the control data or the encrypted data for the user data or the SIM card data, is stored in a ROM of the mobile device.

4. The method of claim 2, wherein the user data includes a portion or the entire contact data in an address book, passwords configured by a user, password reset questions and answers, or passwords or keys generated by the mobile device stored on the mobile device and/or the SIM card.

5. The method of claim 1, further comprising recording, by the storage unit, a number of terminations of the installation of the ROM installation package and/or dates and times of said terminations, when the ROM installation package is verified to have errors or to be undecryptable and the installation of the ROM installation package is terminated.

6. The method recited in claim 5, further comprising deleting all of the data stored on the mobile device when an accumulated number of terminations of the installation has exceeded a predetermined number and/or when a period of time since the initial installation termination has exceeded a predetermined time interval.

7. The method recited in claim 6, wherein the ROM installation package is installed by the ROM installation package control unit without performing a check or decryption procedure at relaunch of the installation process when the accumulated number of terminations of the installation has exceeded a predetermined number and/or when a period of time since the initial installation termination has exceeded a predetermined time interval.

8. An apparatus for controlling updates to a mobile device comprising a storage unit, a ROM installation package control unit and a check-encryption-decryption unit, said storage unit being configured to store the ROM installation package, control data, and/or an encrypted ROM installation package;

said check-encryption-decryption unit being configured:
- to encrypt the ROM installation package stored in the storage unit;
- to check the ROM installation package using the control data, and to send a check result to the ROM installation package control unit; and
- to decrypt the encrypted ROM installation package, and to send a decryption result back to the ROM installation package control unit; and said ROM installation package control unit being configured:
- to verify the encrypted ROM installation package;
- if the encrypted ROM installation package is verified to be correct or to be decryptable, to install the verified or decrypted ROM installation package; and
- if the encrypted ROM installation package is verified to have errors or to be undecryptable, to terminate the installation of the ROM installation package.

9. The apparatus of claim 8, further comprising a settings unit providing a settings interface allowing a user to configure emergency contacts, passwords and password reset questions and answers, and store settings in the storage unit.

10. The apparatus of claim 9, wherein said settings unit further provides a settings interface allowing the user to manually check or encrypt the ROM installation package.

11. The apparatus recited in claim 8, wherein said ROM installation package control unit is further configured to utilize a communication unit of the mobile device to send an alarm message to an emergency contact designated by the user and to respond to a text message instruction sent back from said emergency contact, and to run an operation given in said instruction.

12. The apparatus recited in claim 8, wherein said ROM installation package control unit is further configured to determine a locked or an unlocked state of a screen of the mobile device.

13. The apparatus recited in claim 8, wherein said ROM installation package control unit is further configured to check the ROM installation package or to encrypt the ROM installation package, when a screen of the mobile device is in an unlocked state.

14. The apparatus recited in claim 8, wherein said storage unit is further configured to record a number of terminations of the installation of the ROM installation package and/or dates and times of the terminations, if the encrypted ROM installation package is verified to have errors or to be undecryptable.

15. The apparatus recited in claim 14, wherein said storage unit is further configured to delete all of the data stored on the mobile device when an accumulated number of the terminations of the installation has exceeded a predetermined number and/or when a period of time since the initial installation termination has exceeded a predetermined time interval.

16. The apparatus recited in claim 15, wherein said ROM installation package control unit is further configured to install the ROM installation package without checking or decrypting the ROM installation package at relaunch of the installation process when the accumulated number of terminations of the installation has exceeded a predetermined number and/or when a period of time since the initial installation termination has exceeded a predetermined time interval.

* * * * *